United States Patent [19]

Youngkeit

[11] Patent Number: 4,938,824
[45] Date of Patent: Jul. 3, 1990

[54] METHOD FOR MAKING A COMPOSITE COMPONENT USING A TRANSVERSE TAPE

[75] Inventor: Dean C. Youngkeit, Willard, Utah

[73] Assignee: Thiokol Corporation, Ogden, Utah

[21] Appl. No.: 6,411

[22] Filed: Jan. 23, 1987

[51] Int. Cl.$^5$ .................... B29C 53/62; B29C 53/74
[52] U.S. Cl. ............................... 156/173; 156/174; 156/175; 156/177; 156/189; 156/195; 156/255; 156/446; 428/109; 428/112
[58] Field of Search .............. 156/193, 189, 195, 174, 156/173, 175, 255, 177, 192, 426, 446, 172; 242/7.01–7.02, 7.21–7.23; 428/109, 112; 239/265.11, 265.15

[56] References Cited

U.S. PATENT DOCUMENTS

| | | | |
|---|---|---|---|
| 2,609,320 | 9/1952 | Modigliani | 156/174 |
| 3,111,442 | 11/1963 | Voisin | 156/192 |
| 3,140,968 | 7/1964 | Barrios et al. | 156/195 |
| 3,141,806 | 7/1964 | Reinman | 156/195 X |
| 3,236,711 | 2/1966 | Adler | 156/174 |
| 3,402,085 | 9/1968 | Trimble | 156/195 X |
| 3,549,456 | 12/1970 | Stephens et al. | 156/446 |
| 3,551,254 | 12/1970 | Warner et al. | 156/174 X |
| 3,663,330 | 5/1972 | Sager | 156/174 X |
| 3,698,651 | 10/1972 | Miller | 156/195 |
| 3,711,361 | 1/1973 | Casadevall | 156/195 |
| 3,784,428 | 1/1974 | Willats et al. | 156/174 |
| 3,960,626 | 6/1976 | Casadevall | 156/189 X |
| 4,167,429 | 9/1979 | Ackley | 156/174 |
| 4,182,495 | 1/1980 | Borgmeier et al. | 239/265.11 |
| 4,325,999 | 4/1982 | Campman et al. | 156/181 |
| 4,385,952 | 5/1983 | Futakuchi et al. | 156/174 |
| 4,467,838 | 8/1984 | Rheaume | 156/189 X |
| 4,495,231 | 1/1985 | Laskaris et al. | 156/169 X |
| 4,509,564 | 4/1985 | Sedgewick | 140/92.2 |
| 4,556,440 | 12/1985 | Krueger | 156/177 |
| 4,557,422 | 12/1985 | Gill et al. | 242/1 |
| 4,591,402 | 5/1986 | Evans et al. | 156/350 |
| 4,628,571 | 12/1986 | Marx et al. | 19/304 |
| 4,631,101 | 12/1986 | Rix | 156/175 |
| 4,659,624 | 4/1987 | Yeager et al. | 428/408 |
| 4,673,541 | 6/1987 | Watanabe et al. | 264/25 |
| 4,697,311 | 10/1987 | Bernhardt et al. | 19/161.1 |

OTHER PUBLICATIONS

"Why Knitted Reinforcements are Replacing Woven Roving", Plastics Technology, May 1984, p. 17.

Primary Examiner—Michael W. Ball
Assistant Examiner—Steven D. Maki
Attorney, Agent, or Firm—James C. Simmons; Allen H. Erickson

[57] ABSTRACT

A method and apparatus for making a composite component. For making a non-cylindrical composite component such as a nozzle, a longitudinal winding of at least one fiber strand impregnated with resin is applied onto a generally cylindrical mandrel at a predetermined angle relative to a line parallel to the mandrel rotational axis. A transverse tape is then spirally cut from the layer and wound onto a component mandrel. The wound transverse tape is then compacted and cured and the mandrel removed. A nozzle exit cone is also disclosed made from such transverse tape so that the fiber strand portions are short enough that they do not follow the curvature of the nozzle and thereby peel. The windings are shingled onto the nozzle exit cone so that only one end of each of the fiber strand portions is exposed to the nozzle surface. The fiber strand portions are oriented at a predetermined angle which may be optimized for erosion resistance and stress requirements. In order to form a cylindrical composite component, a cylindrical component mandrel is rotated about its rotational axis in a stationary position, at least one transverse tape of resin impregnated fiber strand portions is supplied to the mandrel in position for rolling onto the mandrel, the transverse tape which is rolled onto the mandrel is compacted and cured, and the mandrel is removed. Apparatus for forming both small cylindrical components such as space strut tubes and large cylindrical components such as rocket motor cases or launch canisters in accordance with this method are also disclosed. Such apparatus may include ultrasonic heads for heating the resin in particular if a thermoplastic resin is used for high impact resistance.

7 Claims, 6 Drawing Sheets

METHOD FOR MAKING A COMPOSITE COMPONENT USING A TRANSVERSE TAPE

The government has rights in this invention pursuant to Contract No. F04704-84-C-0065 awarded by the Department of the Air Force.

The present invention relates to the forming of composite structures from resin impregnated fibrous material.

Aerospace components such as solid fuel rocket nozzles, case skirts, and even cases are increasingly being made of a composite of fibrous material such as carbon, aramid, or graphite which is impregnated with a resin since such composite structures, having adequate strength and other satisfactory qualities, have lighter weight than their metal counterparts.

Such structures have typically been composed of a woven yarn, i.e., a cloth structure of warp and fill yarns which cross at an angle of about 90°. Resin is usually pre-impregnated, then the cloth structure is laid onto the component mandrel. Since the warp and fill strands are 90° apart, the cloth is cut for layup for nozzle components and the like such that the angles of the fiber strands are at about plus or minus 45°. This severely limits the selection of a desired angle of the fiber strands in the composite product to be formed. If, as usual, both the warp and fill components are strength bearing members (balanced cloth) and the angle is other than 45°, then the opposed angles of the warp and fill strands would be undesirably unequal, and either the warp or the fill strands would not be at the optimum angle. On the other hand, the use of non-strength bearing fill material (unbalanced cloth) would constitute a waste of material and would result in a reduction of strength bearing fibrous material in the composite. In addition, the weaving process results in fibers which are not straight but instead are buckled, thus reducing the fiber volume and stress performance in the composite product. High fiber volume is desired to provide increased erosion resistance as well as stress capacity. High fiber volume is also desired to allow low out-gassing for easier processing of carbon-carbon billets and the like. For example, a typical woven cloth nozzle structure may typically provide about 35 to 40% fiber volume in the composite. It is desired to increase the fiber volume to more than about 60%.

Because of some of the disadvantages enumerated above, it has been suggested, as discussed in "Why Knitted Reinforcements Are Replacing Woven Roving", Plastics Technology, May, 1984, page 17, to replace woven roving with knitted reinforcements wherein the reinforcing fibers are inserted into a knitted matrix. This knitted technology is said to provide the advantages of allowing the reinforcing fibers to be laid flat thereby eliminating the crimps that are present where woven fibers cross over and under one another and to allow the fibers to be arranged in a variety of configurations from unidirectional to triaxial. Since this process still requires the fibers to be stitched together with a sewing machine or the like, a very labor intensive and therefore costly process, such a process is also expensive. Even when automated techniques are utilized, the process is expensive.

Nozzle components for solid fueled rocket motors may typically be wound with a bias cut of preimpregnated woven carbon cloth. The resulting composite material may typically contain, by volume, about 38% carbon fiber, 12% carbon filler, 40% phenolic resin, and 10% voids. The interior surface of this composite may typically consist of layers of carbon cloth with warp and fill components both exiting their layer at an angle relative to a layer plane of + and −45°. This interior surface must, during use, be subjected to a hostile environment of extreme erosive forces. The + and −45° fiber exit angle is not an optimized angle for this environment, but this angle is instead dictated by the requirement for woven reinforcements that the warp fibers be 90° out of phase with the fill fibers, and the cloth is bias cut diagonally to leave the fibers exiting at an angle of + and −45° at the edge of each cut so that the opposed angles are equal.

In addition to the expense, stitching of the fiber material causes bumps and ridges which keep the material from adequately debulking resulting in excessive pockets which may cause the resulting component in the areas of such pockets to erode prematurely. It is desirable that the interior surfaces of nozzles have good and uniform erosion resistance.

Although a filament winding machine can wind filaments of fibrous material at any desired angle on a mandrel to form a component, such a process is undesirable for the forming of a nozzle or other structure subjected to similar erosive environments wherein, if the filaments are laid so as to follow the surface curvature over any appreciable distance, they may normally tend to peel and slough away. Thus, in order to form a good nozzle structure so that it is unaffected by this "peeling" tendency, it is desired that the filaments be relatively short so that they need not follow the curvature appreciably.

For the manufacture of cylindrical and other components where filament winding would otherwise be suitable, filament winding is a process often requiring days for the making of a single component. In addition, filament winding is limited to lower or intermediate modulus materials since ultrahigh modulus materials may be too fragile for filament winding. Furthermore, the filament winding process results in a wastage of material in creating the reversal "false domes" along the end surfaces of the cylindrical mandrels where the winding direction is reversed to make another pass. In addition, a filament winding technique does not normally permit the tailoring of different filament angles at different locations along a nozzle or component as may be desired.

It is therefore an object of the present invention to provide a composite component such as a radially inner hot gas contacting portion of a rocket motor nozzle which has improved stress and erosion resistance.

It is another object of the present invention to provide a process for winding non-cylindrical composite structures wherein the fiber orientation may be optimized for high quality.

It is a further object of the present invention to provide such a winding process wherein the composite article has a high fiber volume such as over 60%.

It is yet another object of the present invention to provide such a winding process which lends itself to automated techniques and is thus not labor intensive.

It is still a further object of the present invention to provide a tape winding process wherein the tape can be layed directly from a layup table to a mandrel with little or no handling inbetween.

It is another object of the present invention to provide such a tape winding process which is fast and which lends itself to automated techniques.

It is another object of the present invention to provide such a winding process which results in a low cost composite structure.

It is another object of the present invention to provide such a winding process which results in high structural strength translation and stiffness translation in composite structures.

It is yet another object of the present invention to provide such a winding process wherein the fiber density may be increased and the fiber orientation may be optimized for improved heat sink control.

It is a further object of the present invention to reduce the cooling cracks and char delaminations in composite structures which may result from matrix expansion and contraction as well as outgassing.

It is still a further object of the present invention to provide a method for manufacturing a composite product having a consistently high quality by providing a method which is less sensitive to operator error or judgment.

It is yet another object of the present invention to provide apparatus for such a method which is rugged, inexpensive, and reliable.

The above and other objects, features, and advantages of this invention will be apparent in the following detailed description of the preferred embodiments thereof which is to be read in connection with the accompanying drawings.

DETAILED DESCRIPTION OF THE PREFERRED EMBODIMENTS

Figure 1:
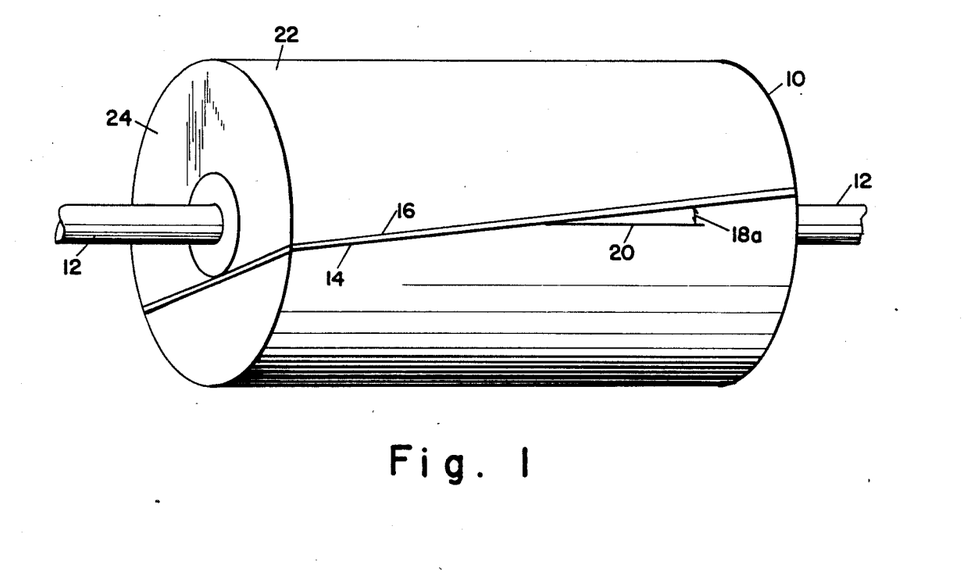
FIGS. 1 and 2 are schematic drawings illustrating in sequence a quick and low cost method for preparing a transverse tape in accordance with the present invention.
Figure 2:
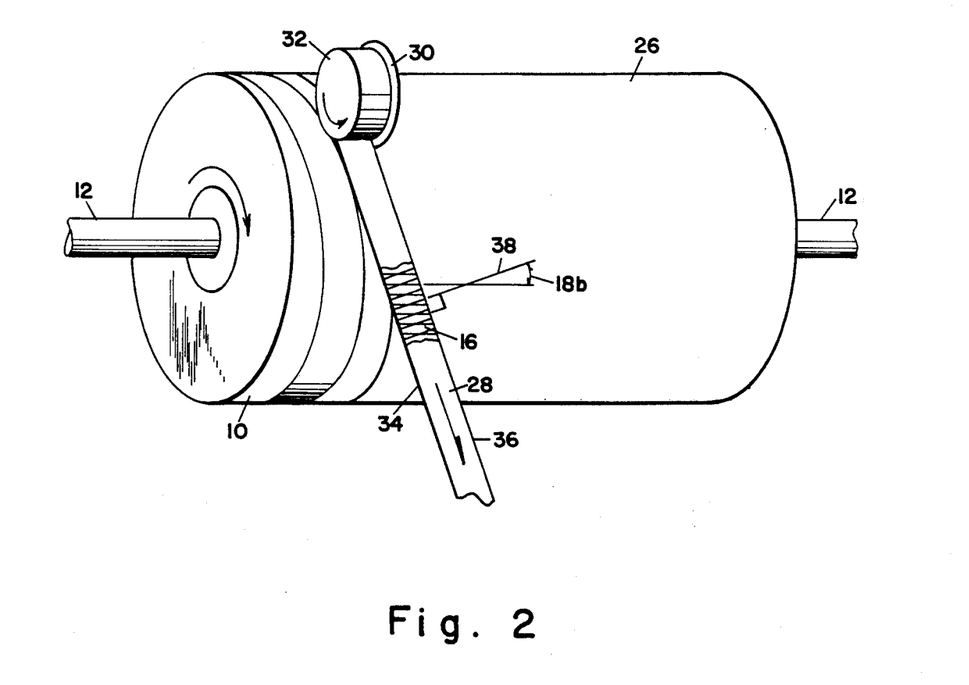

Referring to FIGS. 1 and 2, there is illustrated generally at 10 a generally cylindrical mandrel which includes along its axis of rotation a spindle 12. At 14 is illustrated a tow band of continuous fibrous material impregnated with a suitable matrix material such as resin. The number of tows or fiber strands 16, typically 8 to 16 but may be up to about 64, which make up the tow band may vary depending on such factors as the length and diameter of the mandrel 10.

One or more layers, illustrated at 26 in FIG. 2, of fibrous material is prepared over a suitable backing film or paper (not shown) such as, for example, polyethylene, nylon, or another suitable plastic film on the mandrel 10 by winding tow band 14 thereon by use of any suitable filament winding machine (not shown) commonly known in the art. In accordance with the present invention, the tow band 14 is wound longitudinally on the mandrel 10 across the cylindrical surface 22 thereof at a predetermined desired angle illustrated at 18a relative to a line 20 parallel to the rotational axis of the mandrel 10 which angle is meant to conform substantially to a desired orientation of the fibrous material in a composite component built with the material.

Depending on the mandrel length and diameter and the size of the angle 18a, the tow band 14 may be polar wound, as illustrated in FIG. 1, or, if the angle 18a is relatively large, the tow band may be helically wound. In accordance with the polar winding method (sometimes known as planar winding), the tow band 14 is laid on the mandrel across the cylindrical surface 22 at the predetermined angle 18a effected by utilizing filament winding techniques commonly known and used by those of ordinary skill in the art to which this invention pertains. The tow band 14 is thusly laid on the mandrel surface 22 from one end to the other end afterwhich it is laid along the respective end surface 24 to an appropriate point circumferentially of the cylindrical surface 22 as aided in position by spindle 12, and then again laid across the cylindrical surface 22, and the winding is thusly repeated until the layer 26 is formed with alternate windings across the cylindrical surface 22 laid at angles 18a which are opposed to each other so that the windings cross each other as illustrated by the crossing fiber strand portions 16 in FIG. 2. In accordance with the helical winding method, the angle 18a is sufficiently large such that the winding remains on the cylindrical surface 22 and is laid thereon in a helical fashion commonly known to those of ordinary skill in the art to which this invention pertains. Both the polar and helical winding processes are commonly known to those of ordinary skill in the art to which this invention pertains.

The resulting layer 26 of fibrous material comprises unwoven, unknitted, and unstitched resin impregnated fiber strand portions 16. Referring to FIG. 2, transverse tape 28 of a width suitable for its intended application as will be described hereinafter is spirally cut therefrom by use of a suitable cutting means such as the knife slitter 30 which includes a debulking roller 32 for compacting and releasing air from the layer 26. The advance rate of the knife slitter 30 is equal to the desired tape width which may typically be in the range of 2 to 6 inches. The angle 18b of a fiber strand portion 16 relative to a line 38 perpendicular to an edge 34 or 36 of the tape and in the plane of the tape is thus substantially equal to angle 18a.

The fibrous material in the tape 28 is accordingly unwoven, unknitted, and unstitched resin impregnated fiber strand portions 16. In addition to the expense, stitching of the fiber material causes bumps and ridges which keep the material from adequately debulking and result in excessive pockets which may cause the resulting component to erode easily. In accordance with the present invention, the tape 28 is preimpregnated with a suitable resin, as will be discussed hereinafter, to utilize the tack of resin rather than stitching to hold the filaments of material together and to thus eliminate such undesired bumps, voids, and ridges. However, in accordance with the present invention, it is preferred but not necessary that the fiber strand portions cross each other. Therefore, for the purpose of this specification and the claims, "transverse tape" is defined as a strip of unwoven, unknitted, and unstitched resin impregnated fiber strand portions which form a predetermined angle relative to a line in the plane of the strip which is perpendicular to a side of the strip and which fiber strand portions may or may not cross other fiber strand portions in the strip. The predetermined angle, as illustrated at 18b, is selected to correspond to a desired angle between a fiber strand portion and a line parallel to the rotational axis of a composite structure made with the transverse tape. The transverse tape 28, after it is slitted from the mandrel 10, may then be wound with suitable backing (not shown) such as, for example, polyethylene film or another suitable plastic film onto a material supply spool such as shown at 40 in FIG. 4.

More than one layer 26 of resin impregnated fibrous material may be applied to the mandrel 10 in which case, depending on the desired requirements of a composite component to be made therewith, different layers may be laid of different materials and/or to have different fiber orientations and/or some layers may be helical and some polar.

Figure 3:
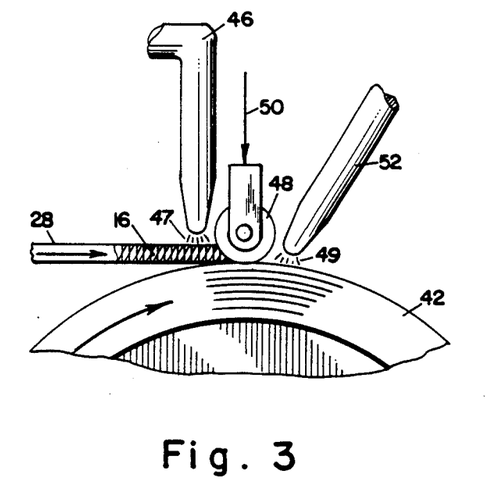
FIG. 3 is a schematic view showing the winding of transverse tape onto a component mandrel to form a composite component in accordance with the present invention.

Referring to FIG. 3, there is illustrated a method of winding the transverse tape 28 onto a component mandrel illustrated at 42 to form a composite component. For ease of illustration, the transverse tape is shown, in FIG. 3, rotated 90° from its actual orientation. The width of the transverse tape 28 will vary depending on the desired characteristics of the component to be made. If the component is to be a nozzle for exhausting hot gases or a structure which may be subjected to a similar erosive environment, the width of the transverse tape is preferably relatively narrow such as, for example, 2 inches so that the filament portions are not required to follow any appreciable component curvature over their length whereby the previously discussed "peeling tendency" may be avoided. If the component is to be non-cylindrical, whether or not it is subjected to an erosive environment, it is also preferred that the transverse tape be narrow since the geometry of the component would otherwise make the tape difficult to apply and result in decreased quality. If the component is to be a cylindrical object which is not subjected to such an erosive environment, such as a strut tube for a space station, the width of the transverse tape 28 may be equal to the strut tube length, for example, 15 feet. The transverse tape 28 may typically have a thickness which is in the range of 0.008 to 0.030 inches, but the thickness may vary depending on the characteristics of the component to be made. As illustrated in FIG. 3, just prior to application of the transverse tape 28 to the component mandrel 42, the transverse tape 28 may be suitably heated by a suitable heat source illustrated at 46 such as, for example, heated air, illustrated at 47, to melt the resin that is impregnated therein to provide good adherence and compacting of the windings to each other. As the transverse tape 28 is applied, a debulking roller 48 to which a suitable compressive force illustrated at 50 is applied compacts the transverse tape 28 onto the mandrel 42 and releases air therefrom. Apparatus illustrated at 52 may be provided to cool the applied transverse tape 28 by any suitable cooling means such as, for example, carbon dioxide, illustrated at 49, to prevent lifting (i.e., blistering away from the surface) of the tape and also to provide a firm foundation for the next successive pass.

Figure 4:
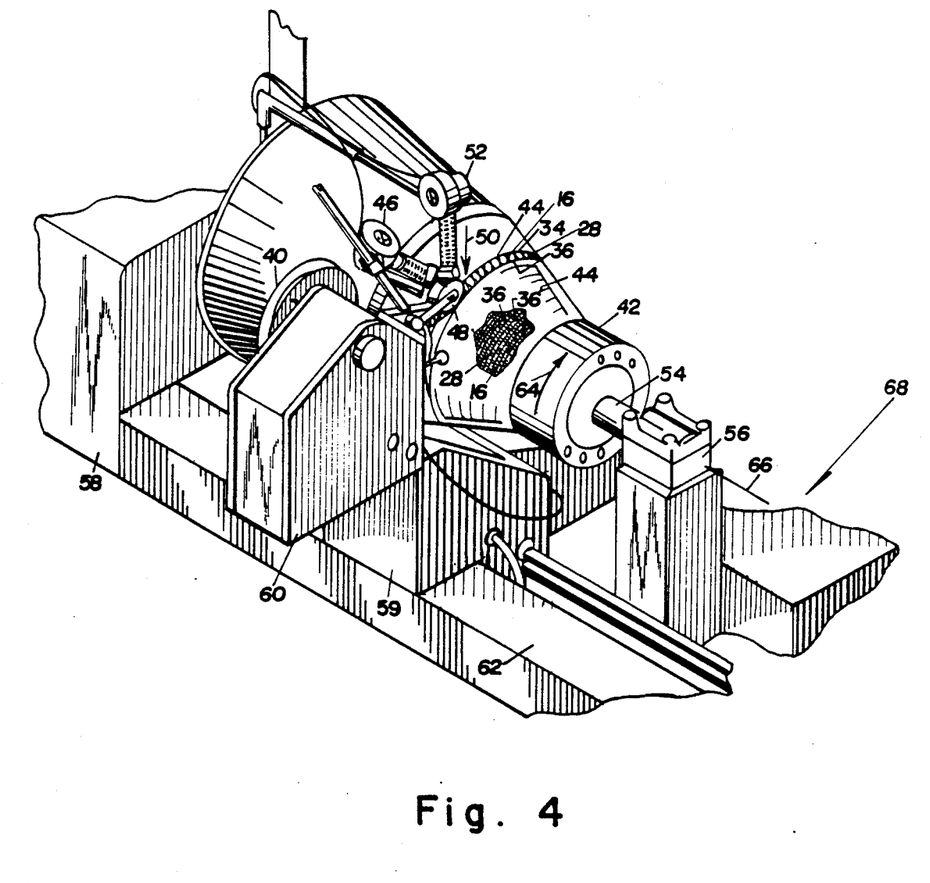
FIG. 4 is a perspective view illustrating the winding of transverse tape onto a component mandrel to form a nozzle in accordance with the present invention.

Referring to FIG. 4, there is shown the application of the transverse tape 28 to the mandrel 42 which, as illustrated, is a mandrel for a nozzle exit cone billet. Tape winding apparatus, which may be any suitable conventional tape winding apparatus found in the art, is illustrated generally at 68. The component mandrel 42 includes a tailstock 54 oriented along the axis of rotation 66 of mandrel 42 and rotatably contained in tailstock support 56. Power is supplied to the apparatus 68 by suitable motor means (not shown) disposed in drive motor housing 58. At 59 is illustrated a carriage which holds tape reel 40 for movement along the platform 62 in a direction parallel to the rotational axis 66 of the mandrel 42. At 60 is illustrated a cross-carriage. Transverse tape windings, illustrated at 44, are applied to the mandrel 42 from supply reel 40 as the mandrel rotates in the direction illustrated at 64 about its rotational axis 66 and as the carriage 59 moves axially along rail 62.

Although a component may be made by applying one pass, i.e., one ply of transverse tape 44 over the mandrel, in some applications it may be desirable to apply two or more plys thereof to the mandrel. For example, it is preferred that the radially inner surface of the nozzle be formed of a good erosion resistant fiber such as, for example, carbon. However, the radially outer portion of the nozzle may desirably be composed of a less expensive fiber such as, for example, fiberglass.

After the nozzle exit cone billet formed by windings 44 is formed, it may then be compacted and cured in an autoclave or by other suitable means in accordance with engineering principles commonly known to those of ordinary skill in the art to which this invention pertains, after which the mandrel 42 is removed and the resulting billet may be machined as desired to provide the finished product.

The transverse tape 28 is wound to provide an overlap between the ply passes, as illustrated in FIG. 4, which may be on the order of a 90 to 95% overlap, to produce what might be termed "shingled windings" wherein only one edge of each winding and therefore only one end of each fiber strand portion 16 is exposed to the surface of the component to ensure that delamination does not occur particularly in composites subjected to erosive environments and/or non-cylindrical composites, such as nozzles, while also orienting the exposed fiber strand ends toward the surface to improve erosion resistance. By "shingled windings", as the term is used in this specification and the claims, is meant windings of fibrous material which overlap the edges of previously laid windings so that only one edge of each winding is exposed to the surface of a component being built with the windings. Furthermore, since the transverse tape 28 allows the angle of the fiber strand portions relative to a line parallel to the component rotational axis to be optimized for best results, the predetermined angle between the fiber strand portions 16 of at least the radially inner composite portion of a nozzle for exhausting hot gases or of other components subjective to such erosive environments and a line parallel to the nozzle rotational axis is preferably optimized for erosion resistance. It is not an object of the present invention to determine what that angle may be, but it may likely be different from 45° which, as previously discussed, is the angle commonly used for cloth windings. By the terms "radial" or "radially", as those terms are used in this specification and the claims, are meant to refer to directions inwardly or outwardly relative to the rotational axis of a component or a mandrel on which the component is made.

Since the radially outer portion of a nozzle is needed not so much for the purpose of erosion resistance as for stiffness or strength, it may, in accordance with this invention, be structurally overwrapped using suitable conventional winding techniques commonly known to those of ordinary skill in the art to which this invention pertains.

Figure 5:
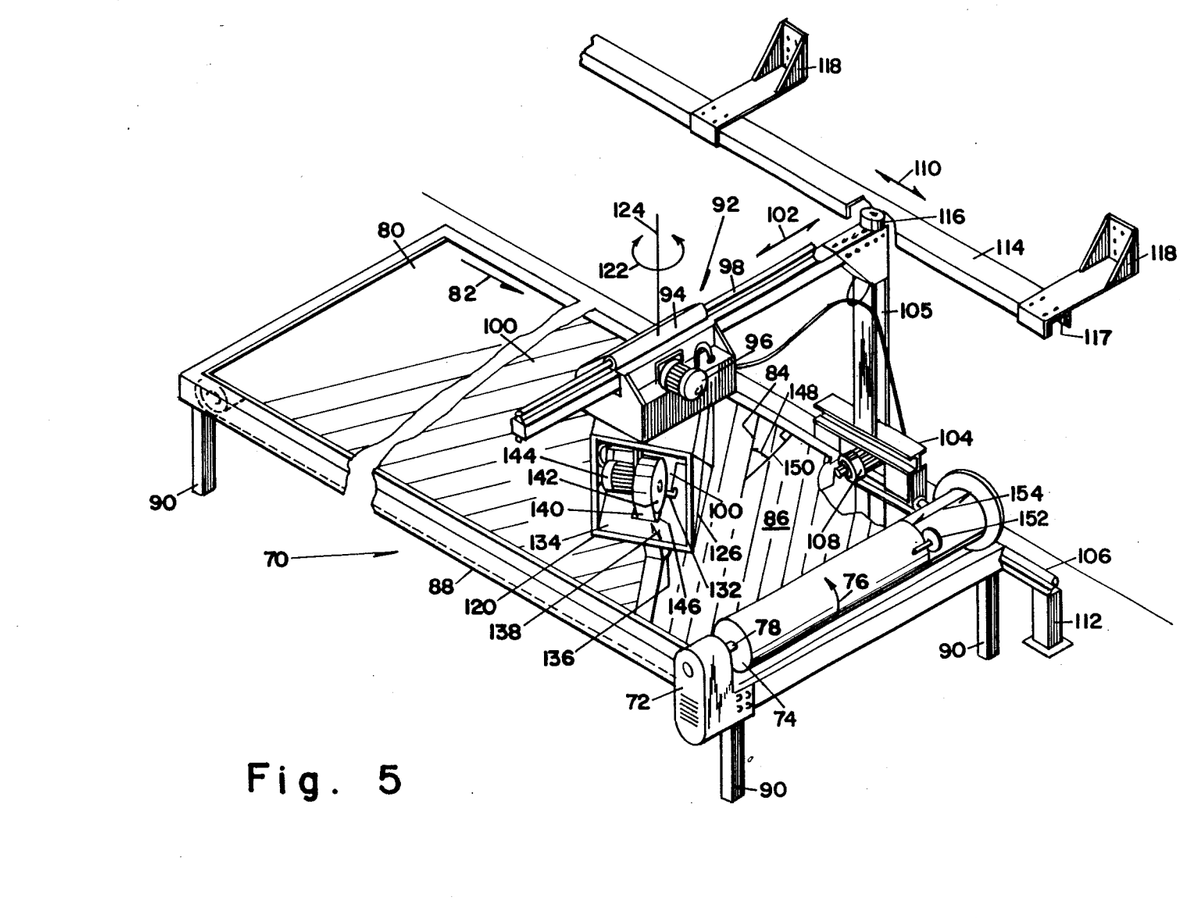
FIG. 5 is a perspective view illustrating apparatus and an alternative method for making transverse tape in accordance with the present invention.

Referring to FIG. 5, there is illustrated an alternative method and apparatus for forming on a mandrel a generally cylindrical roll of a layer of unwoven, unknitted, and unstitched fiber strand portions impregnated with a suitable matrix material such as resin so that transverse tape may be severed therefrom for use as discussed hereinbefore. In addition to those advantages described for the method and apparatus of FIGS. 1 and 2, this more preferred apparatus and method is provided to permit the use of thinner plies and to eliminate the waste of material commonly known as "false domes" which occurs at the end surfaces of a cylindrical mandrel during winding thereon. The apparatus, generally illustrated at 70, includes a holding means, illustrated at 72, for holding in a stationary position a generally cylindrical mandrel 74 for rotation, as illustrated at 76, about its axis of rotation or spindle 78. Apparatus 70 further includes a conveyor belt illustrated at 80 which is preferably endless and supports a composite layer illustrated at 86 (which typically includes two plys at opposed angles to each other) of unwoven, unknitted, and unstitched resin impregnated fiber strand portions for movement as illustrated by arrow 82 to the mandrel 74 to be rolled thereon simultaneously with formation of the layer 86. The holding means 72 and belt 80 are supported on a common support 88 which is in turn supported by legs 90. Movement of the conveyor belt 80 is effected by suitable motive means (not shown) which are commonly known to those of ordinary skill in the art to which this invention pertains.

Generally shown at 92 is an apparatus for forming the composite layer 86 on the conveyor belt 80. Apparatus 92 includes a carriage 94 and a motor 96 or other suitable means for effecting movement, in a direction illustrated at 102 crosswise of the conveyor belt 80, of the carriage 94 along the rail 98 for laying a tow band illustrated at 100 of resin impregnated fiber strand portions. Rail 98 is attached at one end to carriage 104 which is movable on rail 106 by motor 108 longitudinally of the conveyor belt 80 as illustrated by arrow 110 whereby movements of the carriages 94 and 104 may be coordinated with the movement of the conveyor belt 80 preferably by computer means (not shown) to effect laying of the tow band 100 at any desirable angle, such as angle 148, on the conveyor belt 80. Carriage 104 includes a vertical extension member 105 for positioning the rail 98, which is attached thereto, at a suitable height above the conveyor belt 80. Rail 98 cantileverly extends horizontally from the extension member 105 to overhang the width of the conveyor belt 80. Rail 106 is supported by a plurality of legs 112 or other suitable supporting means. The upper end of extension member 105, to which rail 98 is cantileverly attached, is movably supported in frame member 114 by means of roller bearing 116 positioned within the groove 117 thereof. Frame member 114 is in turn supported by two or more brackets 118 which are in turn attached to a wall (not shown) or other suitable support. Thus, carriage 94 is suspended over the conveyor belt 80 for movement both crosswise and longitudinally thereof so that the tow band 100 may be laid at any orientation such as, for example, angle 148 relative to the conveyor belt 80 and therefore relative to a line parallel to the rotational axis 78 of the mandrel 74 when the layer 86 is rolled onto the mandrel.

Apparatus 92 also includes a housing 120 suspended below the carriage 94 and attached to the carriage 94 for rotational movement as illustrated at 122 about a vertical axis illustrated at 124 so that the housing 120 may be oriented, as shown, in the same direction that the tow band 100 is being laid. One of the doors 126, which would normally be shut during operation, has been removed to better illustrate the operation of the machine 92. The tow band 100 with a suitable backing material 140 is unwound from a supply reel (not shown) and guided through slot 132 in the housing floor 134 to the surface of the conveyor belt 80 where it is suitably positioned and compacted by a suitable compacting member at 136 which is biased to apply suitable force downwardly on the tow band 100. The backing material 140 is guided back into the housing 120 through slot 146 in the floor 134 and onto take-up reel 142 which is motorized by motor 144.

The laying of the tow band 100 by the machine 92 onto the conveyor belt 80 at a predetermined angle illustrated at 148 relative to a line 150 perpendicular to a conveyor belt edge (which is the same angle as is formed on the mandrel 74 between a fiber strand portion 84 and a line parallel to the mandrel axis 78) may be effected by computerized control of the movement of the conveyor belt 80 and movement of carriages 94 and 104 in the crosswise and longitudinal directions 102 and 110 respectively with the housing 120 appropriately positioned about axis 124. The particular pattern in which the tow band 100 is laid down and the number of plies depends on the desired characteristics of the component to be made and may be determined in accordance with engineering principles commonly known to those of ordinary skill in the art to which this invention pertains. The tow band 100 is laid down from one side of the conveyor belt 80 to the other afterwhich the carriage 94 is caused to move in the opposite direction toward the other belt edge while continuing to lay down tow band 100, and this process is repeated to form layer 86.

As the layer 86 of resin impregnated fiber strand portions 84 is formed on the conveyor belt it is simultaneously moved in direction 82 by the conveyor belt 80 to mandrel 74 where it is rolled onto the mandrel 74 as it rotates in direction 76. Rotation of the mandrel 76 is effected by a suitable rotating means such as a motor (not shown) which may, for example, be contained within the housing of the holding means 72.

Preferably, a suitable backing member (not shown) is positioned on the conveyor belt prior to the laying of tow band 100 thereon so that the tow band 100 is laid onto the backing member. The layer 86 is rolled up with or without the backing member onto the mandrel 74.

After a desired length of the layer 86 of resin impregnated fiber strand portions oriented at the desired angle 148 has been rolled onto the mandrel 74, the mandrel may, as desired, be either removed from the holding means 72 or left in position, and one or more transverse tapes of a desired width, illustrated at 154, for the particular application for which the tape is to be used may be removed therefrom by cutting with a suitable cutting means illustrated at 152 through the layer 86 in a direction normal to the mandrel axis 78. Unlike the spiral cut illustrated in FIG. 2, the tape 154 in FIG. 5 is cut from the mandrel 74 in a series of separate lengths. The one or more lengths of transverse tape which is thus obtained may be spooled onto reels for ease of handling and transport and used for any desired purpose such as, for example, the winding of the nozzle exit cone billet of FIG. 4. However, in order to avoid fiber buckling from roll-up and roll-out processing, the precut lengths of transverse tape may preferably be flat stacked.

In accordance with an alternative process for use of the apparatus 70 in FIG. 5, the mandrel 74 is a component mandrel which is removed after the layer 86 of fiber strand portions is rolled thereon afterwhich the composite product is compacted and cured, the mandrel removed, and the composite product machined as desired in accordance with principles of common knowledge to those of ordinary skill in the art to which this invention pertains.

Apparatus 92 is not limited to that shown, but, in accordance with the present invention, it may be any suitable conventional apparatus for laying tape known to those of ordinary skill in the art, for example, an apparatus marketed under the trademark Access Atlas II by Goldsworthy Engineering Company Inc. of Torrance, Calif.

Figure 6:
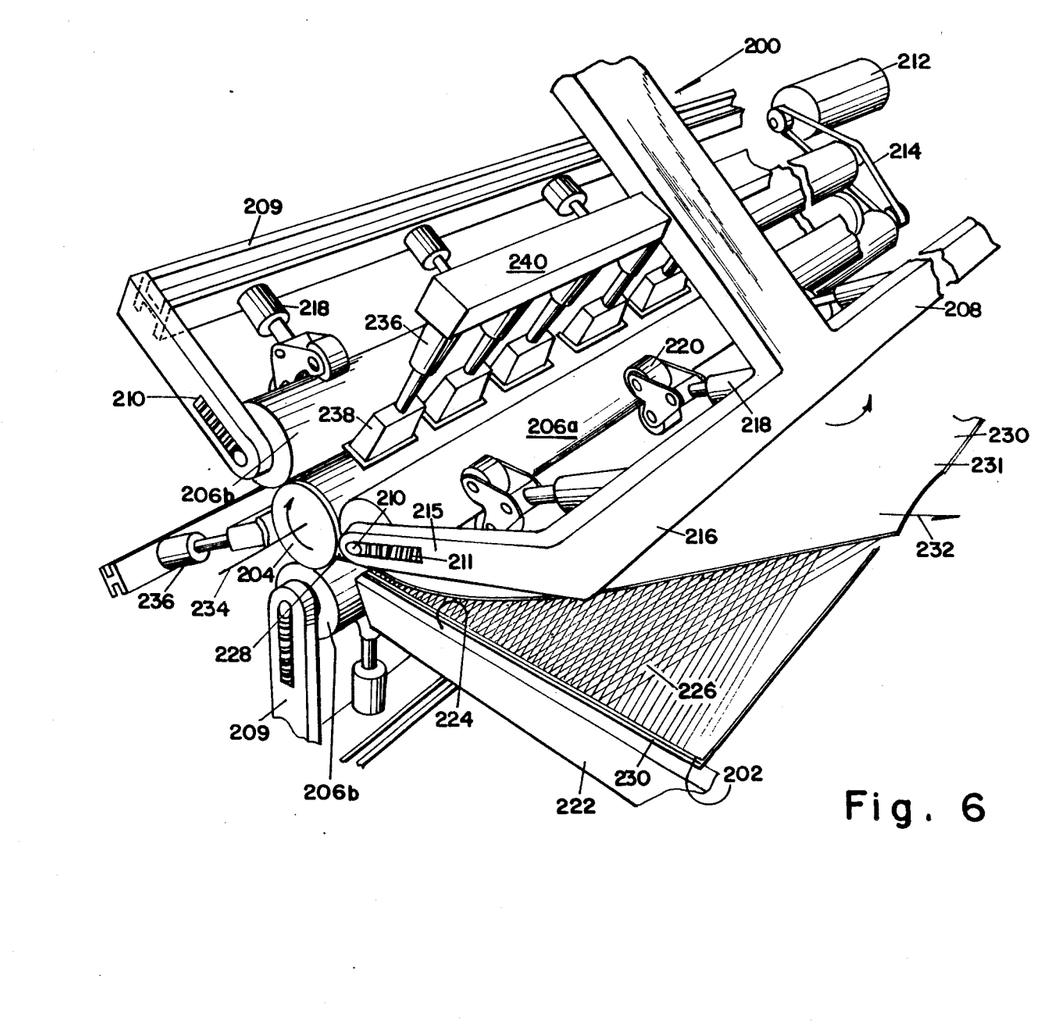
FIG. 6 is a perspective view illustrating apparatus and a method for winding tape onto a mandrel to form a small cylindrical composite component in accordance with the present invention.
Figure 7:
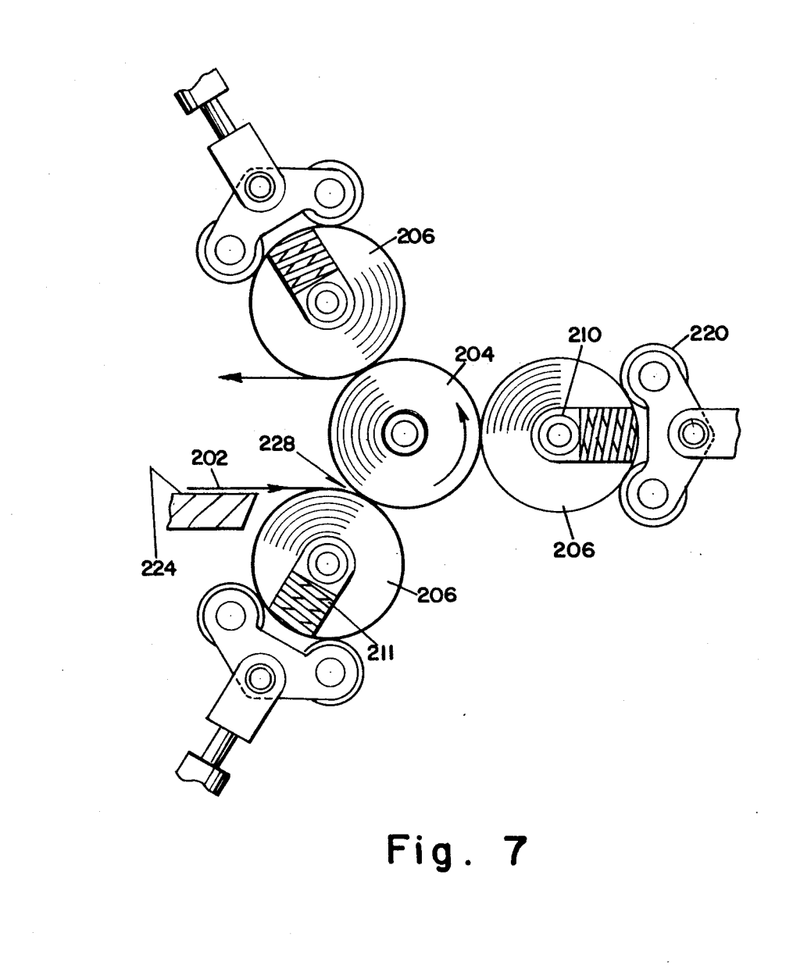
FIG. 7 is a closeup side view of a portion of the apparatus of FIG. 6 illustrating the winding of tape about the mandrel in accordance with the present invention.

For the manufacture of small cylindrical components such as space strut tubes or large cylindrical components such as rocket motor cases where it is unnecessary to use small widths of shingled windings, transverse tape or another suitable tape of resin impregnated fibrous material having the same width as the component length may be applied to a mandrel so that increased production speed may be achieved as compared to a conventional winding process. Generally shown at 200 in FIGS. 6 and 7 is an apparatus for rolling tape or other suitable layer of matrix impregnated fibrous material 202, which has a width equal to the length, for example, 20 or 30 feet, of a small diameter component such as, for example, a space strut tube to be made with the material, onto a component mandrel 204 having a length equal to the length of the component to be made. Mandrel 204 is held in a stationary position for rotation about an axis illustrated at 234 by at least three compaction and drive rollers 206 which are positioned in circumferentially spaced relation about the circumference of the mandrel 204 and which engage and support the mandrel for rotation. An arm lift-up means 208 is attached to the ends of one of the rollers 206a and comprises end bearings 210 including suitable springs 211 to permit rotation of the roller 206, to permit equalization of pressure over the length of the mandrel 204 as described hereinafter, and to effect lifting of the roller 206 away from the mandrel 204 so that the mandrel 204 may be quickly replaced by another mandrel so that efficient mass production of cylindrical components may be achieved. The other two rollers 206b are held in position by members 209 which include similar end bearings 210 at one end and are suitably attached near the other end to the rollers 206b using engineering principles commonly known to those of ordinary skill in the art to which this invention pertains. Suitable drive means such as, for example, air drive motor 212, which may be operated by foot pedal valves (not shown), is connected by belt 214 or other suitable connecting means to an end of each of these other rollers 206b to effect rotation thereof and thereby, due to the engagement over their lengths of the mandrel 204 by the rollers 206a and 206b, effect rotation of the mandrel 204.

The arm lift-up 208 includes member 215 which attaches at one end of the drive roller 206a and which extends radially outwardly therefrom to a beam 216 which extends therefrom in a direction axially of the roller 206a along the length of the roller 206a.

Spaced along the length of the beam 216 preferably about 10 to 14 inches apart and attached thereto and extending, in a direction radially of the roller 206a, inwardly to engage the roller 206a are a plurality of air pressure means 218 for equalizing the pressure on the group of rollers 206 along the lengths thereof. The pressurization means 218 each terminate in a pair of rollers 220 for engaging roller 206a, and an equalized pressure is applied to all of the pressurization means 218 by means (not shown) commonly known to those of ordinary skill in the art to which this invention pertains for application of uniform pressure against the mandrel 204 over the length thereof so that the loads thereon are sufficiently uniform to maintain the mandrel position. As shown in FIG. 6, such air pressure means may also be provided for the other rollers 206b. However, since the forces of reaction by the other rollers 206 must of necessity be also equalized as long as some free play is afforded by spring loaded end bearings 210 on each roller 206a and 206b, it is only necessary, in accordance with the present invention, that one of the rollers 206 be engaged by such pressurization means 218.

A support member 222 such as a tabletop is disposed in position to provide a surface 224 which terminates adjacent the mandrel 204 along the length thereof for supporting and supplying tape 202 or other suitable matrix impregnated fiber portions having a length equal to substantially the mandrel length at a position illustrated at 228 between a drive roller 206 and the mandrel 204 for rolling onto the mandrel 204 as it is rotated by drive rollers 206. The tape 202, having fiber strand portions 226, includes a suitable backing or release film 230, which preferably contains a leader 231, which is separated from the tape 202 and led out from the mandrel 204 as illustrated at 232 as the tape 202 is applied to the mandrel 204. The tape 202 may be manufactured for use in apparatus 200 by a suitable automated tape lay-up machine such as the one shown at 92 in FIG. 5, and the surface 224 may be a conveyor belt surface wherein the tape is manufactured thereon simultaneously with its conveyance to the mandrel 204 for rolling thereon as illustrated in FIG. 5.

For high impact resistance components such as space strut tubes or other components for use in space, the resin used to impregnate the fibers 226 is preferably a thermoplastic resin. The making of a composite component by the rolling of a mandrel on a platen table is unsuitable for the use of thermoplastic resin because of the difficulty of heating the resin sufficiently while the resin impregnated fiber material is being rolled thereon. It is desirable that enough heat be generated to make the thermoplastic resin sufficiently viscous while the resin impregnated fiber material 202 is being rolled onto the mandrel 204 so that it may be cured thereon so as to eliminate the requirement of oven curing. Since, in accordance with the present invention, the rotating mandrel 204 is in a stationary position, a plurality of stationary ultrasonic heads 236 attached to an arm 240 of the arm lift-up 208 and spaced along the length of the mandrel 204 are provided to supply sufficient heat to melt the thermoplastic resin so that the resin impregnated tape or fibrous material 202 may be melted and consolidated while it is being rolled onto the mandrel 204. Each of the ultrasonic heads vibrates at a frequency of perhaps 20,000 hertz and may also include a compaction device 238 for additional compaction of the material thereon. As shown in FIG. 6, similar ultrasonic heads may be provided in connection with members 209.

After the resin impregnated fibrous material 202 is rolled onto the mandrel 204 and the melting and compacting of the fibrous material thereon has occurred, the arm lift-up device 208 is lifted to lift the roller 206a off of the mandrel 204 at which time the mandrel and the composite component thereon may be removed from the apparatus 200 for further compacting and annealing, as needed, for removal of the mandrel 204, and for any machining of the composite component that may be desired. The hydraulic pressure on the pressurization means 218 is reduced to zero for the purposes of lifting the roller 206a away from the mandrel 204 for changing thereof. A new mandrel may be immediately inserted into the apparatus 200 for the production of another composite component so that an efficient mass production of composite components may be achieved. The processes of compacting and curing the layer 202 of fiber strand portions which is rolled onto the mandrel 204, the removal of the mandrel, and the machining of the resulting composite component are all processes which may be effected using principles commonly known to those of ordinary skill in the art to which this invention pertains and will vary depending on the characteristics of the composite component to be made.

Figure 8:
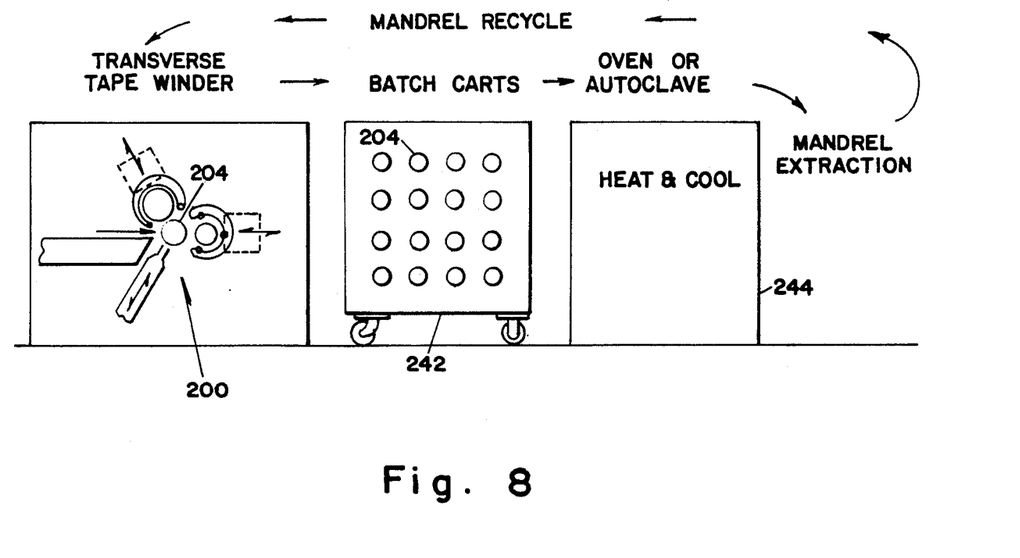
FIG. 8 is a schematic view illustrating the production of cylindrical components in accordance with the present invention.

FIG. 8 illustrates a processing cycle for small composite components such as, for example, space strut tubes. As the mandrels 204 are wound in the tape winder 200, they are placed into batch carts 242 for insertion in an oven or female mold autoclave 244, if needed, where they are appropriately heated and cooled in accordance with principles commonly known to those of ordinary skill in the art to which this invention pertains. The mandrels 204 are then extracted in accordance with principles of common knowledge to those of ordinary skill in the art to which this invention pertains and recycled for winding with tape to produce more composite components. Each of the composite components which has been produced may then be machined as desired.

Figure 9:
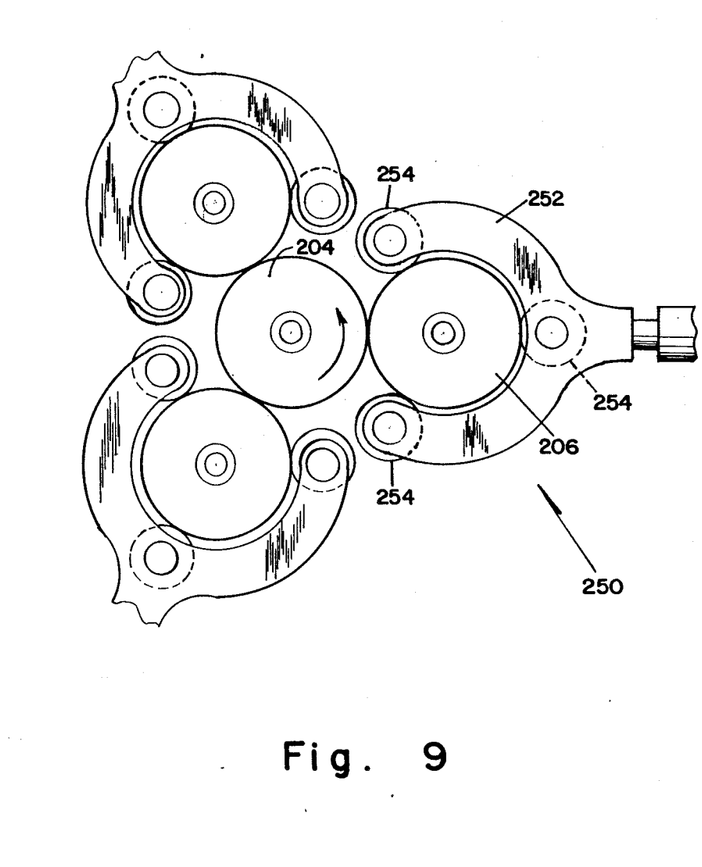
FIG. 9 is a side view of an alternative embodiment of a yoke for the apparatus of FIG. 6.

Referring to FIG. 9, there is shown an alternative embodiment of the pressurization means 218 of FIG. 6. The pressurization means 250 shown in FIG. 9 includes a yoke 252 which partially surrounds the drive roller 206 to hold it for controlling its position for lifting from the mandrel 204 (a function performed for apparatus 200 of FIG. 6 by the spring loaded end bearings 210), for aiding rotation by means of bearings 254 spaced over the yoke inner surface, as well as for the application of pressure to the drive roller 206, as previously described for the pressurization means of FIG. 6, to thus eliminate the necessity of the spring loaded end bearings 210 in FIG. 6.

Figure 10:
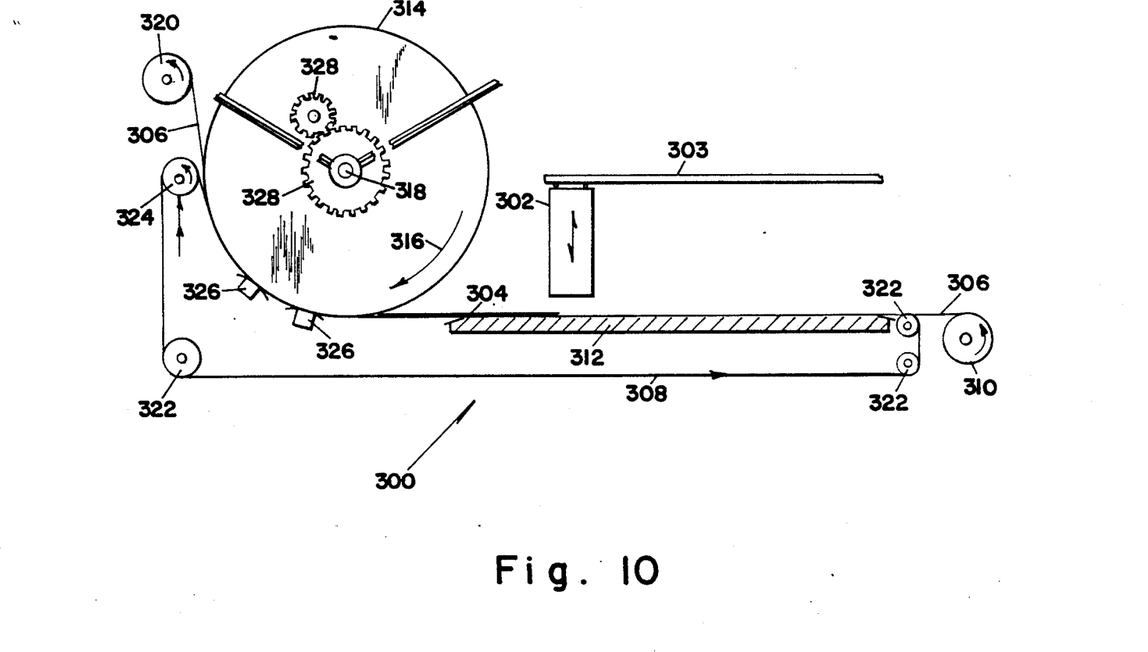
FIG. 10 is a schematic illustrating an alternative embodiment for a process and apparatus for winding large cylindrical composites in accordance with the present invention.

Referring to FIG. 10, there is illustrated an alternative embodiment of apparatus, generally illustrated at 300, and a method for forming a large cylindrical composite component such as, for example, a rocket motor case or launch canister wherein the apparatus of FIG. 6 would have to be unduly large for manufacture thereof.

At 302 is schematically illustrated a suitable tape laying machine including a cantileverly supported rail 303 which may be similar to the tape laying machine 92 illustrated in FIG. 5 or it may be another suitable machine for laying tape. In accordance with the process, one or more plies of matrix impregnated fibrous material 304 is laid onto backing material or release film 306, which is on and conveyed by an endless conveyor belt 308, from supply reel 310. Simultaneously with the laying down of one or more plies of resin impregnated fibrous material 304 on the conveyor belt 308 it is conveyed to cylindrical mandrel 314 which has a length equal to the length of the composite component to be made. The fibrous material 304 is accordingly laid down to have a width equal to the length of the composite component to be made. The conveyor belt 308 is supported for laying down of the layer of fibrous material 304 by the platen or table illustrated at 312.

The mandrel 314 is caused to rotate as illustrated at 316 by suitable rotation means such as, for example, the motorized gears illustrated at 328. As the resin impregnated fibrous material 304 is rolled onto the mandrel 314 as it rotates about its axis 318, the release film is removed therefrom and rolled onto take-up reel 320. Meanwhile the endless belt 308 is guided back to the platen for a continuation of the process by rollers 322 and a conventional hydraulic tension loader 324, the principles of use of which are commonly known to those of ordinary skill in the art to which this invention pertains, for adjusting the belt's tension and for providing mandrel access for winding interspersements.

Similarly as stated with respect to FIG. 6, if it is desired to provide high impact resistance to the component to be built, a thermoplastic resin should be used. Therefore, sufficient heat must be generated to melt the thermoplastic resin as the tape 304 is applied to the mandrel 314. Since the rotating mandrel 314 is in a stationary position, such heat may be applied by suitable spring loaded stationary ultrasonic horns, illustrated at 326 and similar to the ultrasonic heads 236 shown in FIG. 6, which may also be provided for suitably compacting the tape onto the mandrel. However, if it is not necessary to use a thermoplastic resin, air bearings or pressure rollers or other suitable means for compacting the tape 304 may be provided instead. After the tape 304 has been rolled onto the mandrel 314, it may then be compacted, cured, have the mandrel removed, and machined as previously discussed with respect to other composite components.

The use of fibrous material preimpregnated with resin in accordance with the present invention alleviates the necessity of stitching, weaving, knitting, or otherwise attaching the fibrous strand portions together since the fibrous strand portions are held together by the resin tack. Pre-impregnated material further allows the use of a resin which has high temperature resistance since such resins are otherwise too viscous to wet the filaments.

Where the terms "fibrous material", "tow band", or "fiber strand portions" are used in this specification or the claims, these terms are by no means limited to filamentary material as commonly understood. These elements, in accordance with the present invention, are considered as being filamentary or fibrous whether of the commonly considered circular cross-sectional form or of a flat ribbon-like formation. In the flat formation, they also may fall into the category of what normally may be considered as a band. As contemplated in this application, however, bands, besides being individual elements of ribbon-like form, may be composed of elements formed of a plurality of filaments laid side by side. Thus, the material forming a tow band or a layer of fiber strand portions may be composed of anything from individual filaments of fibrous material in their commonly accepted circular cross-sectional form to bands of ribbon-like form, whether such bands be single integral members or be made up of a plurality of filaments. The particular fibrous material selected will depend on variables for the particular type of composite component to be produced including the desired characteristics, the price, and quality. The types of filamentary material which may be used, in accordance with the present invention, includes, but is not limited to, for example, fiberglass, carbon, graphite, or aramid roving. Although, in many applications, low cost fiberglass roving may be suitable, carbon or graphite roving is usually preferred in space applications and in rocket motor case and nozzle applications because this type of roving has lower coefficients of expansion and contraction, a higher modulus of elasticity, and high fiberstress.

The particular resin which will be used will also vary depending upon such variables as the desired characteristics, the price, and quality. The resin, which may be either natural or synthetic, is preferably an epoxide which shrinks less and therefore has a lesser tendency to warp. As previously stated, where high impact resistance is desired, a thermoplastic resin such as, for example, a phenolic resin is preferred. For space applications and other applications where a high quality product is required, it is preferred that the epoxide be a high temperature cure and performance epoxide, i.e., one which has a glassy transition temperature greater than about 400° F. such as, for example, Araldite My 720 or 721 manufactured by Ciba Geigy, and more preferably mixed with Bismaleimid.

Where the term "resin" is used in this specification and the claims, it is meant to refer also to other suitable matrix materials such as ceramic or metallic in which fibrous material may be embedded.

It is to be understood that the invention is by no means limited to the specific embodiments which have been illustrated and described herein, and that various modifications thereof may indeed be made which come within the scope of the present invention as defined by the appended claims.

I claim:

1. A method for making a composite component comprises the steps of:
   a. applying at least one fiber strand impregnated with a matrix material onto a generally cylindrical mandrel at a predetermined angle relative to a line parallel to the rotational axis of the mandrel to form at least one layer of two crossing windings of unwoven, unknitted, and unstitched matrix impregnated fiber strand portions wherein the fiber strand portions are held together by the tack of the matrix material and wherein the fiber strand portions in each winding are parallel to each other wherein the step of applying at least one fiber strand comprises rotating the generally cylindrical mandrel while holding the generally cylindrical mandrel in a stationary position between its ends, forming the layer of fiber strand portions on a conveyor belt, and moving the conveyor belt to convey the layer of fiber strand portions to the generally cylindrical mandrel and rolling the layer of fiber strand portions on the generally cylindrical mandrel as it is formed on the conveyor belt afterwhich the transverse tape is cut from the layer of fiber strand portions while it is on the generally cylindrical mandrel;
   b. cutting from the layer while it is on the mandrel a transverse tape comprising a strip of unwoven, unknitted, and unstitched fiber strand portions which are held together by the tack of the matrix material whereby the fiber strand portions are not held together by weaving, knitting, or stitching, the transverse tape having at least two plies and a pair of parallel edges wherein fiber strand portions in each ply extend parallel to each other between the edges and are oriented at an angle, relative to a line passing through the edges and perpendicular to the edges, which is substantially equal to said predetermined angle;
   c. winding the transverse tape onto a component mandrel;
   d. compacting and curing the wound matrix impregnated transverse tape; and
   e. removing the mandrel.

2. A method for making a composite component comprises the steps of:
   a. applying at least one fiber strand impregnated with a matrix material onto a generally cylindrical mandrel at a predetermined angle relative to a line parallel to the rotational axis of the mandrel to form at least one layer of two crossing windings of unwoven, unknitted, and unstitched matrix impregnated fiber strand portions wherein the fiber strand portions are held together by the tack of the matrix material and wherein the fiber strand portions in each winding are parallel to each other wherein the step of applying at least one fiber strand comprises rotating the generally cylindrical mandrel while holding the generally cylindrical mandrel in a stationary position between its ends, forming the layer of fiber strand portions on a conveyor belt, and moving the conveyor belt to convey the layer of fiber strand portions to the generally cylindrical mandrel and rolling the layer of fiber strand portions on the generally cylindrical mandrel as it is formed on the conveyor belt afterwhich the transverse tape is cut from the layer of fiber strand portions while it is on the generally cylindrical mandrel;
   b. cutting from the layer while it is on the mandrel a transverse tape comprising a strip of unwoven, unknitted, and unstitched fiber strand portions which are held together by the tack of the matrix material whereby the fiber strand portions are not held together by weaving, knitting, or stitching, the transverse tape having at least two plies and a pair of parallel edges wherein fiber strand portions in each ply extend parallel to each other between the edges and are oriented at an angle, relative to a line passing through the edges and perpendicular to the edges, which is substantially equal to said predetermined angle;
   c. winding the transverse tape onto a component mandrel;
   d. compacting and curing the wound matrix impregnated transverse tape; and
   e. removing the mandrel, wherein the method further comprises selecting the matrix material from the group of thermoplastic resins and heating the transverse tape while it is on the mandrel to melt the matrix material in the transverse tape as it is being rolled onto the mandrel.

3. A method for making a composite component comprises the steps of:

a. applying at least one fiber strand impregnated with a matrix material onto a generally cylindrical mandrel at a predetermined angle relative to a line parallel to the rotational axis of the mandrel to form at least one layer of two crossing windings of unwoven, unknitted, and unstitched matrix impregnated fiber strand portions wherein the fiber strand portions are held together by the tack of the matrix material and wherein the fiber strand portions in each winding are parallel to each other wherein the step of applying at least one fiber strand comprises rotating the generally cylindrical mandrel while holding the generally cylindrical mandrel in a stationary position between its ends, forming the layer of fiber strand portions on a conveyor belt, and moving the conveyor belt to convey the layer of fiber strand portions to the generally cylindrical mandrel and rolling the layer of fiber strand portions on the generally cylindrical mandrel as it is formed on the conveyor belt afterwhich the transverse tape is cut from the layer of fiber strand portions while it is on the generally cylindrical mandrel;

b. cutting from the layer while it is on the mandrel a transverse tape comprising a strip of unwoven, unknitted, and unstitched fiber strand portions which are held together by the tack of the matrix material whereby the fiber strand portions are not held together by weaving, knitting, or stitching, the transverse tape having at least two plies and a pair of parallel edges wherein fiber strand portions in each ply extend parallel to each other between the edges and are oriented at an angle, relative to a line passing through the edges and perpendicular to the edges, which is substantially equal to said predetermined angle;

c. winding the transverse tape onto a component mandrel;

d. compacting and curing the wound matrix impregnated transverse tape; and e. removing the mandrel, the method further comprising selecting the matrix material to have a glass transition temperature greater than about 400° F.

4. A method for making a composite component comprises the steps of:

a. applying at least one fiber strand impregnated with a matrix material onto a generally cylindrical mandrel at a predetermined angle relative to a line parallel to the rotational axis of the mandrel to form at least one layer of two crossing windings of unwoven, unknitted, and unstitched matrix impregnated fiber strand portions wherein the fiber strand portions are held together by the tack of the matrix material and wherein the fiber strand portions in each winding are parallel to each other wherein the step of applying at least one fiber strand comprises rotating the generally cylindrical mandrel while holding the generally cylindrical mandrel in a stationary position between its ends, forming the layer of fiber strand portions on a conveyor belt, and moving the conveyor belt to convey the layer of fiber strand portions to the generally cylindrical mandrel and rolling the layer of fiber strand portions on the generally cylindrical mandrel as it is formed on the conveyor belt afterwhich the transverse tape is cut from the layer of fiber strand portions while it is on the generally cylindrical mandrel;

b. cutting from the layer while it is on the mandrel a transverse tape comprising a strip of unwoven, unknitted, and unstitched fiber strand portions which are held together by the tack of the matrix material whereby the fiber strand portions are not held together by weaving, knitting, or stitching, the transverse tape having at least two plies and a pair of parallel edges wherein fiber strand portions in each ply extend parallel to each other between the edges and are oriented at an angle, relative to a line passing through the edges and perpendicular to the edges, which is substantially equal to said predetermined angle;

c. winding the transverse tape onto a component mandrel;

d. compacting and curing the wound matrix impregnated transverse tape; and e. removing the mandrel, wherein the step of winding the transverse tape onto a component mandrel comprises applying a plurality of shingled windings on the component material.

5. A method for making a composite component comprises the steps of:

a. applying at least one fiber strand impregnated with a matrix material onto a generally cylindrical mandrel at a predetermined angle relative to a line parallel to the rotational axis of the mandrel to form at least one layer of two crossing windings of unwoven, unknitted, and unstitched matrix impregnated fiber strand portions wherein the fiber strand portions are held together by the tack of the matrix material and wherein the fiber strand portions in each winding are parallel to each other wherein the step of applying at least one fiber strand comprises rotating the generally cylindrical mandrel while holding the generally cylindrical mandrel in a stationary position between its ends, forming the layer of fiber strand portions on a conveyor belt, and moving the conveyor belt to convey the layer of fiber strand portions to the generally cylindrical mandrel and rolling the layer of fiber strand portions on the generally cylindrical mandrel as it is formed on the conveyor belt afterwhich the transverse tape is cut from the layer of fiber strand portions while it is on the generally cylindrical mandrel;

b. cutting from the layer while it is on the mandrel a transverse tape comprising a strip of unwoven, unknitted, and unstitched fiber strand portions which are held together by the tack of the matrix material whereby the fiber strand portions are not held together by weaving, knitting, or stitching, the transverse tape having at least two plies and a pair of parallel edges wherein fiber strand portions in each ply extend parallel to each other between the edges and are oriented at an angle, relative to a line passing through the edges and perpendicular to the edges, which is substantially equal to said predetermined angle;

c. winding the transverse tape onto a component mandrel;

d. compacting and curing the wound matrix impregnated transverse tape; and e. removing the mandrel, wherein the step of winding the transverse tape onto a component mandrel comprises applying a plurality of shingled windings on the component mandrel, the method further comprising selecting the matrix material to have a glass transition temperature greater than about 400° F.

6. A method for making a composite component comprises the steps of:
   a. applying at least one fiber strand impregnated with a matrix material onto a generally cylindrical mandrel at a predetermined angle relative to a line parallel to the rotational axis of the mandrel to form at least one layer of two crossing windings of unwoven, unknitted, and unstitched matrix impregnated fiber strand portions wherein the fiber strand portions are held together by the tack of the matrix material and wherein the fiber strand portions in each winding are parallel to each other wherein the step of applying at least one fiber strand comprises rotating the generally cylindrical mandrel while holding the generally cylindrical mandrel in a stationary position between its ends, forming the layer of fiber strand portions on a conveyor belt, and moving the conveyor belt to convey the layer of fiber strand portions to the generally cylindrical mandrel and rolling the layer of fiber strand portions on the generally cylindrical mandrel as it is formed on the conveyor belt afterwhich the transverse tape is cut from the layer of fiber strand portions while it is on the generally cylindrical mandrel;
   b. cutting from the layer while it is on the mandrel a transverse tape comprising a strip of unwoven, unknitted, and unstitched fiber strand portions which are held together by the tack of the matrix material whereby the fiber strand portions are not held together by weaving, knitting, or stitching, the transverse tape having at least two plies and a pair of parallel edges wherein fiber strand portions in each ply extend parallel to each other between the edges and are oriented at an angle, relative to a line passing through the edges and perpendicular to the edges, which is substantially equal to said predetermined angle;
   c. winding the transverse tape onto a component mandrel;
   d. compacting and curing the wound matrix impregnated transverse tape; and
   e. removing the mandrel, wherein the step of winding the transverse tape onto the component mandrel comprises applying a plurality of shingled windings on the component mandrel, the method further comprising selecting the at least one fiber strand to be composed of a material selected from the group consisting of carbon and graphite.

7. A method for making a composite component comprises the steps of:
   a. applying at least one fiber strand impregnated with a matrix material onto a generally cylindrical mandrel at a predetermined angle relative to a line parallel to the rotational axis of the mandrel to form at least one layer of two crossing windings of unwoven, unknitted, and unstitched matrix impregnated fiber strand portions wherein the fiber strand portions are held together by the tack of the matrix material and wherein the fiber strand portions in each winding are parallel to each other wherein the step of applying at least one fiber strand comprises rotating the generally cylindrical mandrel while holding the generally cylindrical mandrel in a stationary position between its ends, forming the layer of fiber strand portions on a conveyor belt, and moving the conveyor belt to convey the layer of fiber strand portions to the generally cylindrical mandrel and rolling the layer of fiber strand portions on the generally cylindrical mandrel as it is formed on the conveyor belt afterwhich the transverse tape is cut from the layer of fiber strand portions while it is on the generally cylindrical mandrel;
   b. cutting from the layer while it is on the mandrel a transverse tape comprising a strip of unwoven, unknitted, and unstitched fiber strand portions which are held together by the tack of the matrix material whereby the fiber strand portions are not held together by weaving, knitting, or stitching, the transverse tape having at least two plies and a pair of parallel edges wherein fiber strand portions in each ply extend parallel to each other between the edges and are oriented at an angle, relative to a line passing through the edges and perpendicular to the edges, which is substantially equal to said predetermined angle;
   c. winding the transverse tape onto a component mandrel;
   d. compacting and curing the wound matrix impregnated transverse tape; and
   e. removing the mandrel, wherein the step of winding the transverse tape onto a component mandrel comprises applying a plurality of shingled windings on the component mandrel, the method further comprising selecting the at least one fiber strand to be composed of a material selected from the group consisting of carbon and graphite and further comprising selecting the matrix material to have a glass transition temperature greater than about 400° F.

* * * * *